May 20, 1952     R. P. HAMILTON     2,596,995
BEEHIVE SUPER
Filed May 28, 1947
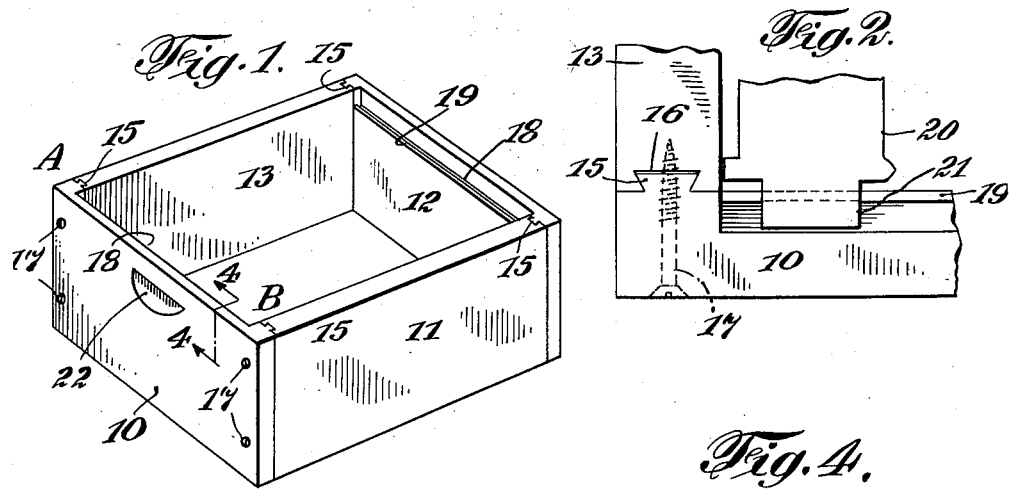
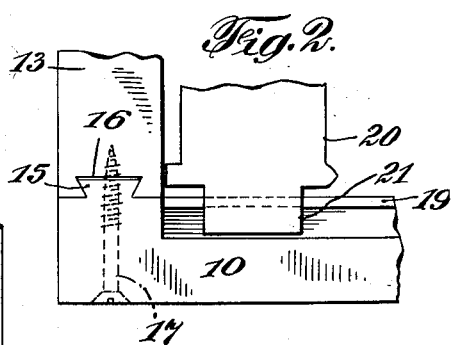
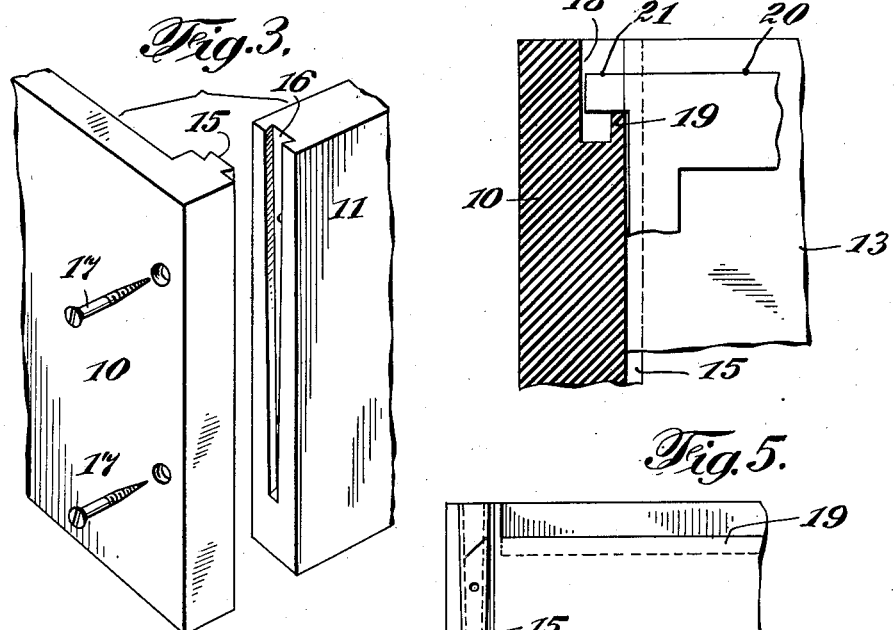
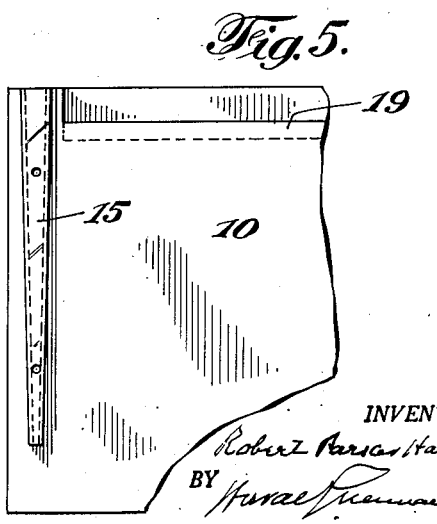
INVENTOR.
Robert Parsons Hamilton
BY
ATTORNEY Patented May 20, 1952

2,596,995

UNITED STATES PATENT OFFICE 2,596,995

BEEHIVE SUPER

Robert Parker Hamilton, River Edge Manor, N. J., assignor of one-half to Edward C. Wheaton, Rutherford, N. J.

Application May 28, 1947, Serial No. 750,924

7 Claims. (Cl. 6—1)

My invention relates to beehives and refers particularly to beehives formed from a plurality of superimposed supers.

One of the objects of my invention is beehive supers adapted to be superimposed upon each other in order to form a beehive.

Another object of my invention is beehive supers adapted to be readily assembled and disassembled.

Another object of my invention is beehive supers in which the adjacent sides have a complete and perfect jointure with each other.

Another object of my invention is beehive supers having means adapted to allow of the ready introduction and withdrawal of a plurality of honeycomb frames.

A beehive super comprises a box-like structure without a top or bottom.

In operation, a plurality of honeycomb frames are suspended within the super in spaced relationship with respect to each other, each frame having a sheet of wax foundation therein.

The desired number of such prepared supers are then placed upon each other, the bottom super being placed upon a board and having a small opening therein for the entrance and exit of bees, and a removable cover is then placed upon the uppermost super.

There is thus formed a closed chamber, with the exception of the entrance opening for the bees, in which there is a plurality of honeycomb frames spaced from each other, these spaces allowing the bees to travel over all of the wax foundation of the honeycomb frames and deposit their wax and build their combs thereon.

In order that the most successful results may be obtained it is essential that these supers be thoroughly cleaned and fumigated after each completion of the comb forming and honey depositing periods, and that the super be disassembled for this purpose, and, hence, the ease of separating the sides of the super is an essential feature of beehives of such construction.

It is also essential that the jointure of the sides should be so complete as to prevent the passage of undesirable insects therethrough.

I accomplish these desirable results by means of the particular jointure of my invention, the attributes of which will be evident upon a consideration of my specification and its accompanying drawings.

In the particular form of a device of my invention illustrated in the drawings, similar parts are indicated by similar numerals.

Fig. 1 is a top perspective view of one form of a super of my invention.

Fig. 2 is an enlarged fragmentary top view of the corner "A" of the super of Fig. 1.

Fig. 3 is an enlarged fragmentary top view of the unattached elements of the corner "B" of the super of Fig. 1.

Fig. 4 is an enlarged section through the line 4—4 of Fig. 1.

Fig. 5 is an enlarged fragmentary inside view of one of the side members of the super shown in Fig. 1 having an extended wedge-shaped tongue.

The particular form of a super element of a vertical sectional beehive of my invention shown in the accompanying drawings comprises four sides 10, 11, 12, and 13.

Each side member 10 and 12 has an outwardly extended downwardly tapered wedge-shaped tongue 15 at each side thereof; and each side member 11 and 13 has an inwardly extended downwardly tapered wedge-shaped groove 16 in each side thereof, each groove 16—16 being adapted to allow of the downwardly insertion of the tongue 15. Longitudinal movement of each tongue 15 in its groove 16 is prevented by screws 17—17 passing through the side member, its tongue, into and through a groove and into the other side member.

The device, therefore, can be readily assembled by passing the side tongues downwardly through the corresponding grooves and inserting the screws.

The upper inner face edge portions of two opposite side members 10 and 12 are cut away to form a recess 18 and the upwardly extended member 19 for the support of a comb frame, as indicated in Figure 4, having the body portion 20 and the extended portion 21.

Each side member 10 and 12 has a depression 22 adapted for convenience in handling the super.

It will be noted that the beehive boxes of my invention are so constructed that ants and other small insects can not enter through the jointures of the sides, that they are readily constructed and that they are economic in production.

My invention is not limited to the specific size, shape, number, arrangement or material of parts as shown and described, as these may be varied without going beyond the scope of my invention.

What I claim is:

1. A beehive super comprising two U-shaped side members and two straight side members, the extremities of a portion of each said U-shaped side members having an outwardly extended tapered wedge-shaped tongue, and the extremities of a portion of each said straight side member having an inwardly extended tapered wedge-shaped groove, each said groove being vertically disposed and being adapted to removably receive the said tongue of the adjacent U-shaped side member.

2. A beehive super comprising two U-shaped side members and two straight side members, the extremities of a portion of each said U-shaped side members having an outwardly extended downwardly tapered wedge-shaped tongue, and the extremities of a portion of each said straight side member having an inwardly extended downwardly tapered wedge-shaped groove, each said groove being adapted to removably receive the said tongue of the adjacent U-shaped side member.

3. A beehive super comprising two U-shaped side members and two straight side members, the extremities of a portion of each said U-shaped side members having an outwardly extended downwardly tapered wedge-shaped tongue, and the extremities of a portion of each said straight side member having an inwardly extended downwardly tapered wedge-shaped groove, each said groove being adapted to removably receive the said tongue of the adjacent U-shaped side member and removable means adapted to prevent the accidental movement of said tongue within said groove.

4. A beehive super comprising two U-shaped side members and two straight side members, the extremities of a portion of each said U-shaped side members having an outwardly extended downwardly tapered wedge-shaped tongue, and the extremities of a portion of each said straight side member having an inwardly extended downwardly tapered wedge-shaped groove, each said groove being adapted to removably receive the said tongue of the adjacent U-shaped side member and removable threaded means adapted to prevent the accidental movement of said tongue within said groove.

5. A beehive super comprising two U-shaped side members and two straight side members, the extremities of a portion of each said U-shaped side members having an outwardly extended downwardly tapered wedge-shaped tongue, and the extremities of a portion of each said straight side member having an inwardly extended downwardly tapered wedge-shaped groove, each said groove being adapted to removably receive the said tongue of the adjacent U-shaped side member and means for removably supporting honey comb frames introduced into said super.

6. A beehive super comprising two U-shaped side members and two straight side members, the extremities of a portion of each said U-shaped side members having an outwardly extended downwardly tapered wedge-shaped tongue, and the extremities of a portion of each said straight side member having an inwardly extended downwardly tapered wedge-shaped groove, each said groove being adapted to removably receive the said tongue of the adjacent U-shaped side member, removable means adapted to prevent the accidental movement of said tongue within said groove and means for removably supporting honey comb frames introduced into said super.

7. A beehive super comprising two U-shaped side members and two straight side members, the extremities of a portion of each said U-shaped side members having an outwardly extended downwardly tapered wedge-shaped tongue, and the extremities of a portion of each said straight side member having an inwardly extended downwardly tapered wedge-shaped groove, each said groove being adapted to removably receive the said tongue of the adjacent U-shaped side member and removable threaded means adapted to prevent the accidental movement of said tongue within said groove, and means for removably supporting honey comb frames introduced into said super.

ROBERT PARKER HAMILTON.

REFERENCES CITED

The following references are of record in the file of this patent:

UNITED STATES PATENTS

| Number | Name | Date |
| --- | --- | --- |
| 4,355 | Sabine | Jan. 15, 1846 |
| 945,642 | Toth | Jan. 4, 1910 |
| 1,117,180 | Gamallo | Nov. 15, 1914 |
| 1,425,295 | Summerfield | Aug. 8, 1922 |
| 1,896,334 | Toth | Feb. 7, 1933 |
| 2,278,850 | Hammond | Apr. 7, 1942 |